United States Patent [19]

Kilby

[11] Patent Number: 4,628,704

[45] Date of Patent: Dec. 16, 1986

[54] SURGE TANK FOR AIR-CONDITIONING COMPRESSOR

[75] Inventor: Robert D. Kilby, Orchard Lake, Mich.

[73] Assignee: Michigan Special Products, Inc., Oxford, Mich.

[21] Appl. No.: 529,794

[22] Filed: Sep. 6, 1983

[51] Int. Cl.⁴ .............................................. F25D 19/00
[52] U.S. Cl. ........................................ 62/296; 29/523; 72/69; 72/80; 417/540
[58] Field of Search .............. 62/296; 417/540; 72/69, 72/80; 29/523; 228/60

[56] References Cited

U.S. PATENT DOCUMENTS

| | | |
|---|---|---|
| 2,106,495 | 1/1938 | Debor ........................................ 72/80 |
| 2,406,059 | 8/1946 | Burch ........................................ 72/69 |
| 2,595,319 | 5/1952 | Woldman et al. .................... 228/60 |
| 3,785,167 | 1/1974 | Sahs ........................................ 62/296 |
| 3,793,863 | 2/1974 | Groppini .............................. 228/60 |
| 3,916,642 | 11/1975 | Mullins ................................. 62/292 |
| 3,940,168 | 2/1976 | Balon ..................................... 29/523 |

Primary Examiner—Ronald C. Capossela
Attorney, Agent, or Firm—Stephenson and Boller

[57] ABSTRACT

A new and improved surge tank for the refrigeration circuit of an automobile air-conditioning system is fabricated from tube stock and comprises a unitary main cylindrical body having a sidewall and end walls. The end walls are formed by friction spinning.

23 Claims, 5 Drawing Figures

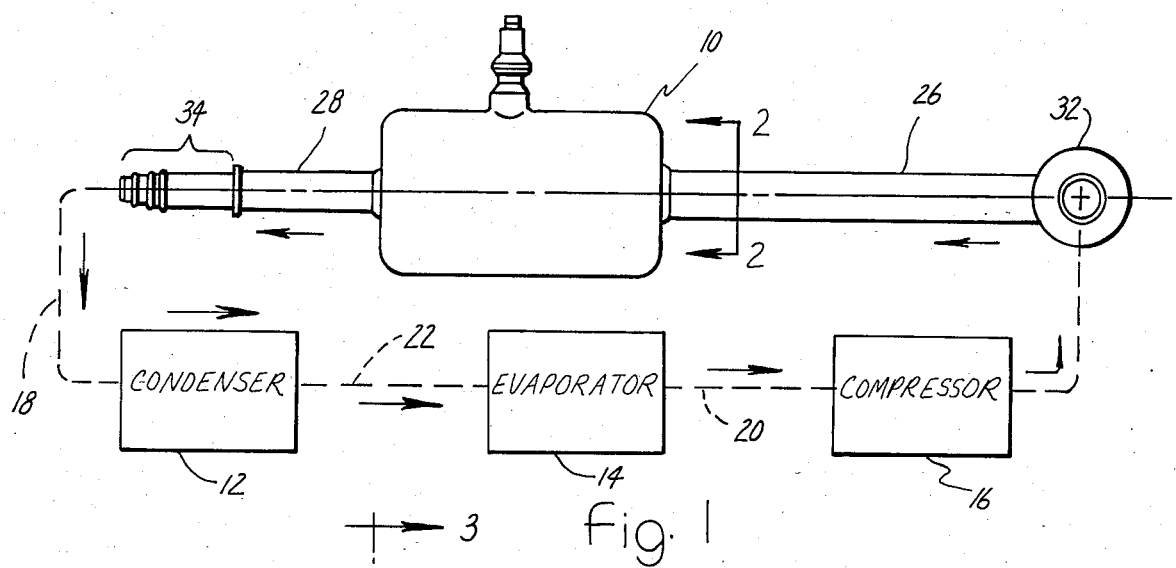
Fig. 1
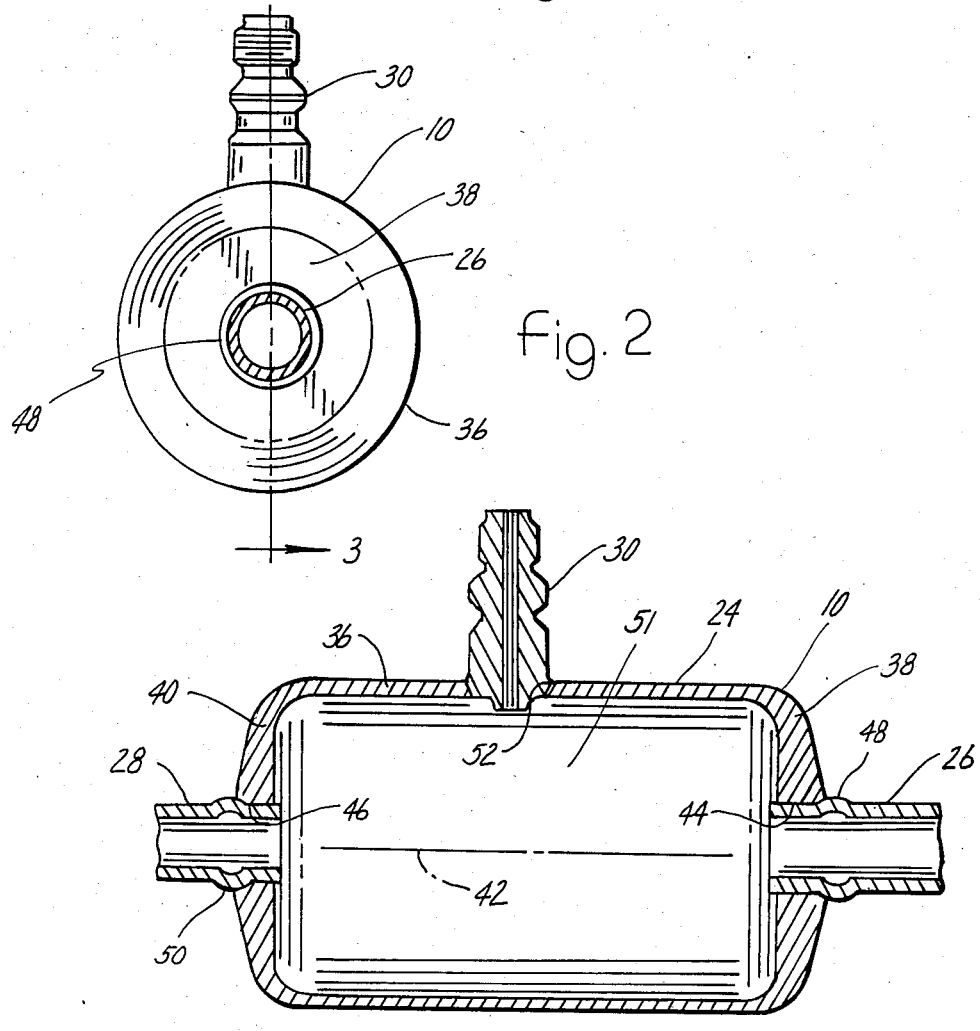
Fig. 2
Fig. 3

SURGE TANK FOR AIR-CONDITIONING COMPRESSOR

BACKGROUND AND SUMMARY OF THE INVENTION

This invention relates generally to compressor refrigeration systems such as employed in automobile air-conditioners, and is more specifically concerned with a new and unique construction for a surge tank for use with the compressor.

A typical automobile air-conditioning system comprises a closed refrigeration circuit containing a compressor, a condenser, and an evaporator. The evaporator comprises a heat exchange unit in which liquid refrigerant is allowed to expand and evaporate thereby absorbing heat from air passing across the heat exchange surface. The gaseous refrigerant containing the absorbed heat is drawn via the suction line into the compressor where it is compressed and then discharged via the discharge line to the condenser. The condenser comprises another heat exchange unit wherein the hot pressurized refrigerant is condensed into liquid by heat exchange action. The liquid refrigerant is then returned to the evaporator via the liquid line where it is once again allowed to expand. The compressor is driven by the engine to circulate refrigerant through the system, and additional devices and controls are associated with the system whereby the desired air-conditioning action takes place to the comfort of the occupants.

In operation the compressor produces a pulsating output. The output pulsations will fluctuate depending upon a number of factors such as the particular construction of the compressor and refrigeration system, the particular operating conditions, and the particular setting of associated controls. Therefore, it is desirable to minimize such fluctuations and one way to do so is by including a surge tank at the compressor outlet in the discharge line to the condenser. The surge tank is effective to dampen the fluctuations and thereby promote better operation. By minimizing fluctuations, peak pressures can be reduced, a more steady flow promoted, and noise can be attenuated. This promotes improved system operation and longer life for the components.

Previous techniques for making production surge tank bodies typically comprise fabrications from separate metal parts assembled together. One previous technique involves cutting a tube to a desired length and then assembling formed caps onto the ends of the tube. Another previous technique involves forming a heavy impact extrusion and then assembling a cap onto the open end of the extrusion. Welding and brazing are conventional operations used to join the separate parts.

Production surge tanks must meet very stringent requirements for refrigerant leakage. Because the previous techniques described above result in surge tank bodies having welded or brazed joints extending around their circumferences, a significant rejection rate in the production of such tanks occurs due to excessive refrigerant leakage through the joints.

In the case of a welded joint, the weldment may appear outwardly satisfactory but in fact may have minute pin holes which can give rise to excessive refrigerant leakage.

In the case of a surge tank one of whose parts is a heavy impact extrusion, the effectiveness of brazing is often impaired because of the manner in which the extrusion is made. In order to produce a satisfactory part, the extrusion process may require the application of a certain lubricant to the material being extruded. Such lubricant is difficult to remove from the extruded part and it is a hindrance to subsequent effective brazing.

Despite the significant rejection rates for production surge tanks which occur using the aforementioned techniques, these manufacturing procedures have been tolerated since no more effective ones have apparently been developed.

The present invention is directed to a new and improved construction for surge tanks of the type used in automobile air-conditioning systems. It offers a number of important advantages over the prior techniques described above.

Perhaps the most significant attribute of the invention is that the rejection rate for production surge tanks is significantly lowered because it yields surge tanks which are less susceptible to refrigerant leakage. This means a reduction in the amount of scrappage and re-work required, leading to significant productivity improvements. This of course has important benefits for both manufacturer and consumer.

The fabrication process which is used in practice of the invention is itself efficient and a further contributor to productivity. For example, the prior technique of fabricating a heavy extrusion involves an appreciable energy expenditure merely to form the extrusion, and subsequent welding and/or brazing procedures are still necessary to join the several parts of the surge tank body.

The procedure involved with the present invention does not require the use of lubricants nor other materials which could have an adverse effect on the surge tank, either during its fabrication process or subsequently.

Briefly the present invention involves the application of friction spinning to conventional tube stock to form the surge tank body. This procedure results in a surge tank in which the body is a unitary piece devoid of seams except at locations where tubes and/or fittings are assembled to the body. No special extrusion techniques or formed caps are required and therefore labor, material and fabrication costs can be reduced.

The invention also has the advantage that the fabrication process can be adapted to produce a surge tank body of a desired shape. This is an important consideration in the disclosed application in an automobile air-conditioning system because the arrangement of the automobile engine compartment in which the surge tank is located in association with the engine-driven compressor usually imposes severe constraints on the space available for the surge tank. With the present invention, the shape can be readily modified in a number of different ways which will become more apparent from the ensuing description. Different embodiments of the surge tank of the present invention are disclosed herein by way of examples and these may comprise bodies in which one or both end walls are formed by friction spinning.

The well known down-sizing and quality improvement efforts in the automobile industry also make weight savings and improved component performance important considerations.

The present invention, in addition to the advantages previously discussed, meets the objectives of using light-weight material, (aluminum or aluminum alloys are the preferred materials), and has an organization which efficiently uses material so as to favorably impact on the amount of material used. The finished product is better suited to the quality improvement effort of the industry than is the prior multi-piece body construction.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a longitudinal view of a surge tank embodying principles of the present invention shown in association with a schematic representation of a typical refrigeration circuit of an automotive air-conditioning system.

FIG. 2 is a view taken generally in the direction of arrows 2—2 in FIG. 1 but on an enlarged scale.

FIG. 3 is a cross sectional view taken in the direction of arrows 3—3 in FIG. 2 to illustrate a central longitudinal sectional view through the surge tank.

DESCRIPTION OF THE PREFERRED EMBODIMENT

Figure 4:
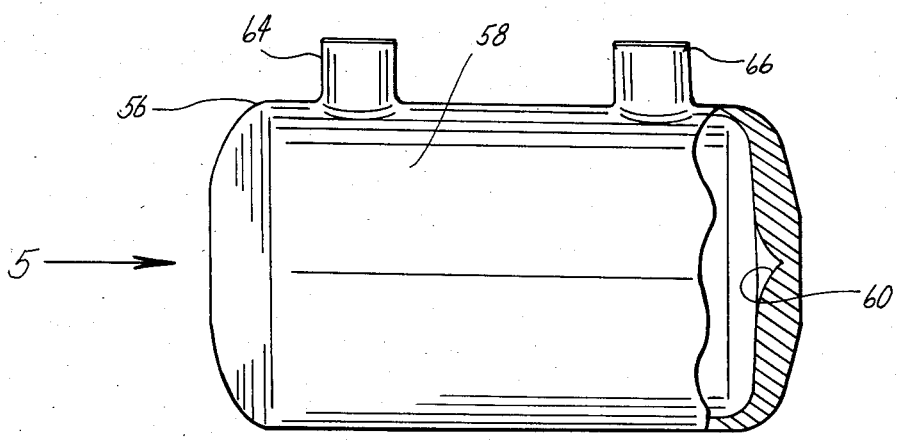
FIG. 4 is a longitudinal view partly in section of another embodiment of surge tank embodying principles of the present invention.

The drawings illustrate a surge tank 10 embodying principles of the present invention. In FIG. 1 surge tank 10 is shown in association with the schematic representation of a refrigeration circuit of a typical automotive air-conditioning system. The system includes a condenser 12, an evaporator 14, and a compressor 16 connected in a closed circuit by refrigerant lines. Surge tank 10 is connected in the discharge line 18. The suction line from evaporator 14 to compressor 16 is identified by the reference numeral 20, and the liquid line from condenser 12 to evaporator 14 is designated by the reference numeral 22. The direction of flow through the system is indicated by small arrows and in FIG. 1 is in the counter-clockwise sense.

Briefly, the refrigeration system operates such that liquid refrigerant is introduced into evaporator 14 and allowed to expand in the evaporator. The evaporator comprises a heat exchange unit into which the liquid refrigerant is introduced and allowed to expand and absorb heat from another fluid, air in this case, which passes across the heat exchange surface. The air is thereby cooled and circulated to the passenger compartment.

Compressor 16 is driven by the engine and provides a suction force via suction line 20 to suck the gaseous refrigerant from evaporator 14. Compressor 16 compresses the gaseous refrigerant and discharges it into the surge tank. It passes via discharge line 18 to condenser 12. Condenser 12 comprises a heat exchange unit in which heat is removed from the pressurized refrigerant causing it to liquefy. The cooled liquid refrigerant is then supplied via liquid line 22 to the evaporator to complete the circuit.

It will be appreciated that the foregoing description is of a general nature and that there will typically be other specific components in the system, such as for example an expansion valve for the evaporator and a dryer. There will also be various controls for controlling the air-conditioner's operation.

The function of surge tank 10 is to provide a surge chamber space in the discharge line which is effective to smooth out fluctuations in the output of the compressor so that the surge tank functions in the manner explained above.

Turning therefore to details of surge tank 10 as shown in FIGS. 1, 2 and 3, one will observe that the surge tank comprises a unitary main cylindrical body 24, an inlet tube 26, an outlet tube 28, and a charging port 30. The illustrated construction for tube 26 includes a fitting 32 via which the tube can directly connect to compressor 16. The left hand end of tube 28 is shaped to provide a conventional construction 34 onto which the end of a conventional flexible refrigerant line can be inserted and secured. These particular details of the end connections of the surge tank tubes are merely illustrative, and other embodiments may be made in accordance with principles of the invention.

The illustrated construction for surge tank 10 comprises body 24 having a circular cylindrical sidewall 36 with transverse end walls 38 and 40 at opposite longitudinal ends. This particular surge tank is also arranged such that body 24 and tubes 26 and 28 are coaxial with respect to a longitudinal axis 42.

It will be observed that sidewall 36 has nominal wall thickness throughout. Each end wall 38 and 40, however, has a thickness which progressively increases in the radially inward direction from where it joins with sidewall 36. As can be seen in FIG. 2 the end walls do not extend completely to axis 42. but rather terminate in circular surfaces 44 and 46 respectively which are coaxial with axis 42 and which circumferentially surround the respective tubes 26 and 28. The tubes 26 and 28 have respective circular flanges 48 and 50 which are disposed against the end walls, and a short end segment of each tube extends through the corresponding end wall and even protrudes slightly into the interior chamber space 51 of the surge tank.

The end walls 38 and 40 are created through the use of friction spinning operations whereby the surge tank main body is of unitary construction and not the multipiece body construction of prior surge tanks. The fabrication process comprises main body 24 being formed from a straight circular cylindrical piece of tube stock having a nominal wall thickness corresponding to the nominal wall thickness of sidewall 38. The length of the tube stock is greater than the illustrated final length of main body 24 because the end segments of the tube stock must be friction spun to form the end walls 38 and 40. The spinning procedure comprises the tube stock being chucked on the spindle of a spinning machine and spun about axis 42 at a suitable speed. A suitable tool such as a spinning wheel is operated to engage each end segment of the spinning tube stock and forcefully displace it radially inwardly to form the end walls. The result is that the end walls are integral with the sidewall. Where an end wall is to receive a tube, such as in the FIG. 1 embodiment, the circular surfaces 44, 46 are created by drilling holes in the end walls after the friction spinning. Hence the end walls should be formed sufficiently to allow the holes to be drilled so as to produce the desired circular shapes to receive the tubes. The tubes are inserted into the holes defined by the circular surfaces 44 and 46 and are brazed in place whereby leak-proof joints are formed between the tubes and the end walls.

The fabrication process is itself an efficient procedure, and the finished article is efficient in its use of material. A circular cylindrical walled vessel has inherent hoop strength in the circumferential direction. Thus, its sidewall can, from the standpoint of structural considerations, be of a smaller thickness than its end walls, and that is the construction which is achieved in the finished surge tank.

After the spinning procedure has been completed and the tubes have been assembled and brazed to the main body, the surge tank could be put to use. However, the surge tank provides a suitable means for mounting a charging port, and if desired, such a port may be incorporated. An aperture 52 is made in sidewall 36 for the charge port, for example by drilling. The inner end of a charge port body 54 is inserted into aperture 52, and a suitable joining procedure such as brazing is used to join the sidewall of the surge tank and the outside of the charge port body around aperture 52 in a leak-proof joint. The charge port comprises a cylindrical fitting which contains a suitable valved construction for mating connection with a complementary fitting on apparatus for charging and re-charging of the system with refrigerant.

Aluminum and its alloys are especially good materials for spinning procedures and are not porous to refrigerant. Hence, the tube stock from which the main surge tank body 24 is formed is of such a material. Tubes 26 and 28 are also preferably of such material. Thus, there is material compatibility between the component parts of surge tank 10. In an automotive air-conditioning system the use of such materials is beneficial from the standpoints of compatibility with other system components and minimizing weight.

Figure 5:
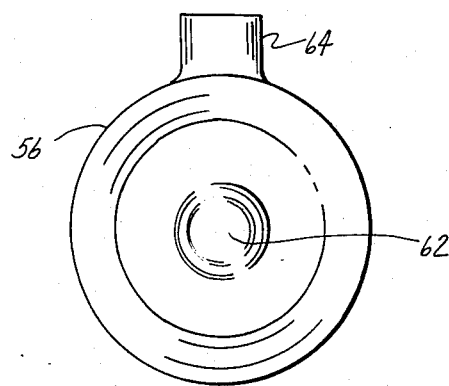
FIG. 5 is an end view taken in the direction of arrow 5 in FIG. 4.

FIGS. 4 and 5 illustrate another embodiment of surge tank 56 according to principles of the present invention. In this embodiment the surge tank body 58 is fabricated from circular cylindrical tube stock and both ends are spun fully closed. In this regard it will be observed that each end wall has a shape which progressively increases in the radially inward direction, but at the radially innermost region it has an internal dimple 60 which can be seen in the sectioned away end. During the friction spinning operation, the spinning rate and the feed of the wheel which is used to close the ends of the tube may be set in such a way that the central region of the end wall outer surface actually becomes molten. In a finished production part this appears as a shiny circular area and an example of this is demonstrated in FIG. 5 where the circle identified by the reference numeral 62 defines such as region. The procedure promotes superior closures at the ends of the tank.

The embodiment of FIGS. 4 and 5 also differs from that of the preceding embodiment in that the inlet and outlet tubes 64, 66 are assembled to the sidewall of the surge tank body, rather than the end walls. The tubes are assembled by first drilling suitable holes at suitable locations in the sidewall, inserting the tubes into the holes and then suitably joining the tubes to the wall around the holes by a suitable procedure such as brazing.

Although FIGS. 4 and 5 illustrate this embodiment of surge tank to have the inlet and outlet tubes in circumferential alignment about axis 42 and in uniform spacing from the end walls, this arrangement is merely representative. The tubes may be arranged in any desired pattern. They may be circumferentially offset; they may be of different sizes; one may be in an end wall, and another in a sidewall; the charge port may or may not be included; indeed, it would even be possible to mount the charge port in an end wall. This demonstrates the adaptibility of the invention to accommodate constraints imposed upon it by virtue of the limited space which may be available in an automobile engine compartment. Moreover while both embodiments of surge tank have been shown to be of generally the same overall shape insofar as their bodies are concerned, it is entirely possible for bodies of other shapes to be fabricated. For example, it is possible to have longer or shorter chambers; chambers of larger or smaller diameters; and differently shaped end walls. The end walls may have simple or compound radii of curvature.

The invention eliminates the multi-piece construction of prior surge tanks, and accordingly it significantly reduces refrigerant leakage resulting in improved productivity for manufacturing and improved performance for use.

The particular details of the spinning procedure will depend upon the nature of the particular spinning equipment which is available. A suitable spinning machine may be capable of simultaneously spinning both ends of the tube stock simultaneously or one at a time.

Thus, there has been disclosed an improved surge tank construction in which an efficient manufacturing operation results in a product which contains an efficient use of materials for the application involved, and which is effective in use. While a preferred embodiment has been disclosed, it will be appreciated that principles of the invention are applicable to other embodiments.

What is claimed is:

1. In an automobile air-conditioning system of the type comprising a compressor, a condenser, and an evaporator connected in a closed refrigeration circuit by refrigerant lines, the improvement which comprises a surge tank in the line from the compressor to the condenser, said surge tank comprising a unitary cylindrical body defining a surge chamber space bounded by a sidewall and a pair of end walls, an inlet to communicate the surge chamber space to the compressor, and an outlet to communicate the surge chamber space to the condenser, and wherein both said end walls are formed by friction spinning to be integral with said sidewall whereby a one-piece body devoid of any circumferential seam is produced.

2. The improvement set forth in claim 1 in which said sidewall has a nominal wall thickness and said end walls have wall thicknesses which are greater than the nominal thickness of said sidewall.

3. The improvement set forth in claim 2 in which said end walls have wall thicknesses which progressively increase in the direction away from said sidewall.

4. The improvement set forth in claim 3 in which said inlet and outlet comprise tubes having respective joints with the surge tank body, and said tubes protrude slightly into the surge tank chamber space from their respective joints with the surge tank body.

5. The improvement set forth in claim 1 wherein said surge tank and said tubes comprise aluminum or an aluminum alloy.

6. The improvement set forth in claim 1 further including a charging port on said body via which refrigerant may be introduced into the surge tank.

7. A surge tank for use in an automotive air-conditioning system between a compressor and a condenser, said surge tank comprising a unitary body defining a surge chamber space and having a sidewall and end walls, said end walls being disposed at opposite longitudinal ends of said sidewall and said end walls having thicknesses which progressively increase in the direction away from said sidewall, and in which both said end walls are formed by friction spinning integral with said sidewall whereby a one-piece body devoid of any circumferential seam is produced.

8. A surge tank as set forth in claim 7 including tubes joining with said body.

9. A surge tank as set forth in claim 8 in which said tubes join with said end walls.

10. A surge tank as set forth in claim 8 in which said tubes join with said sidewall, said end walls being fully closed by friction spinning.

11. A surge tank adapted for use in a refrigeration circuit between a compressor and condenser, said surge tank comprising a unitary body defining a surge chamber space, said unitary body comprising a sidewall and two end walls both being formed by friction spinning integral with said sidewall whereby a one-piece body devoid of any circumferential seam is produced, and an inlet and an outlet for connecting the surge chamber space in circuit.

12. A surge tank as set forth in claim 11, one of said inlet and said outlet comprising a tube joined to one of said end walls to form a leak-proof joint.

13. A surge tank as set forth in claim 11, one of said inlet and said outlet comprising a tube joined to said sidewall, said end walls both being fully closed by friction spinning.

14. In a method of making a compressor refrigeration system surge tank of the type comprising a body defining a surge chamber space and an inlet and an outlet for communicating the surge chamber space, the improvement for making said body comprising friciton spinning one end of tube stock to form a spun end wall at the one end integrally joining with a sidewall, and friction spinning the other end of the tube stock to form an end wall at the other end of the tube stock integrally joining with the sidewall whereby a one-piece body devoid of any circumferential seam is produced.

15. The improvement set forth in claim 14 including the step of forming an aperture in said one end wall and joining a tube to said one end wall at said aperture to form one of said inlet and outlet.

16. A surge tank made by the method of claim 15.

17. The improvement set forth in claim 15 including the step of inserting said tube into said aperture and brazing said tube to said one end wall around said aperture.

18. A surge tank made by the method of claim 17.

19. The improvement set forth in claim 14 in which at least one of said end walls is fully closed by friction spinning.

20. A surge tank body made by the method of claim 19.

21. A surge tank body made by the method of claim 14.

22. A cylindrical body adapted for use in an assembly in a compressor refrigeration circuit to define a chamber space comprising one piece aluminum or aluminum alloy having a circular sidewall of nominal thickness and endwalls, both said end walls being formed by friction spinning integral with said sidewall to a thickness greater than the nominal thickness of said sidewall, whereby a one-piece body devoid of any circumferential seam is produced, and an inlet and an outlet for connecting the chamber space formed by said body in circuit.

23. The method of making a cylindrical tank body adapted for use in an assembly in a compressor refrigeration circuit to define a chamber space through which refrigeration is circulated, said method comprising forming said tank from material to create a tubular sidewall with an integral end wall at one end while the opposite end is still open, then friction spinning the opposite end of the sidewall to form an integral end wall at said opposite end, whereby a one-piece body devoid of any circumferential seam is produced and attaching an inlet and an outlet to said tank body to enable it to be connected in circuit.

* * * * *